US008589014B2

(12) United States Patent
Fairfield et al.

(10) Patent No.: US 8,589,014 B2
(45) Date of Patent: Nov. 19, 2013

(54) SENSOR FIELD SELECTION

(75) Inventors: Nathaniel Fairfield, Mountain View, CA (US); Jiajun Zhu, Sunnyvale, CA (US); Dmitri A. Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/150,385

(22) Filed: Jun. 1, 2011

(65) Prior Publication Data
US 2012/0310466 A1 Dec. 6, 2012

(51) Int. Cl.
*G05D 1/02* (2006.01)
*G01S 7/40* (2006.01)

(52) U.S. Cl.
USPC .......................................................... 701/28

(58) Field of Classification Search
CPC ............................................... B60R 2300/301
USPC ................................................................ 701/28
See application file for complete search history.

(56) References Cited

U.S. PATENT DOCUMENTS

| | | | |
|---|---|---|---|
| 5,163,002 A | 11/1992 | Kurami | |
| 6,151,539 A | 11/2000 | Bergholz et al. | |
| 6,691,003 B1 * | 2/2004 | Stortz et al. | 701/1 |
| 6,771,208 B2 | 8/2004 | Lutter et al. | |
| 7,233,683 B2 * | 6/2007 | Han et al. | 382/104 |
| 7,275,431 B2 | 10/2007 | Zimmermann et al. | |
| 7,499,804 B2 | 3/2009 | Svendsen et al. | |
| 7,610,123 B2 * | 10/2009 | Han et al. | 701/14 |
| 7,903,021 B2 * | 3/2011 | Aso et al. | 342/70 |
| 8,126,642 B2 * | 2/2012 | Trepagnier et al. | 701/423 |
| 8,150,574 B2 * | 4/2012 | Han et al. | 701/28 |
| 8,160,811 B2 * | 4/2012 | Prokhorov | 701/300 |
| 8,280,623 B2 * | 10/2012 | Trepagnier et al. | 701/301 |
| 2006/0100783 A1 | 5/2006 | Haberer et al. | |
| 2008/0162027 A1 * | 7/2008 | Murphy et al. | 701/117 |
| 2009/0125174 A1 | 5/2009 | Delean | |
| 2010/0106356 A1 | 4/2010 | Trepagnier et al. | |

(Continued)

FOREIGN PATENT DOCUMENTS

| | | | | |
|---|---|---|---|---|
| DE | 19948252 A1 * | 6/2001 | | G01S 7/40 |
| DE | 19948254 A1 * | 11/2001 | | G01S 7/40 |

(Continued)

OTHER PUBLICATIONS

JPO machine translation of JP 2010-134656.*

(Continued)

*Primary Examiner* — James Trammell
*Assistant Examiner* — David Testardi
(74) *Attorney, Agent, or Firm* — Lerner, David, Littenberg, Krumholz & Mentlik, LLP

(57) ABSTRACT

Aspects of the present disclosure relate generally to safe and effective use of autonomous vehicles. More specifically, an autonomous vehicle is able to detect objects in its surroundings which are within the sensor fields. In response to detecting objects, the computer may adjust the autonomous vehicle's speed or change direction. In some examples, however, the sensor fields may be changed or become less reliable based on objects or other features in the vehicle's surroundings. As a result, the vehicle's computer may calculate the size and shape of the area of sensor diminution and a new sensor field based on this area of diminution. In response to identifying the area of sensor diminution or the new sensor field, the vehicle's computer may change the control strategies of the vehicle.

17 Claims, 13 Drawing Sheets

(56) References Cited

U.S. PATENT DOCUMENTS

| | | | |
|---|---|---|---|
| 2010/0194593 A1* | 8/2010 | Mays | 340/905 |
| 2011/0102195 A1* | 5/2011 | Kushi et al. | 340/905 |
| 2012/0253582 A1* | 10/2012 | Chrysanthakopoulos et al. | 701/26 |
| 2012/0316725 A1* | 12/2012 | Trepagnier et al. | 701/26 |

FOREIGN PATENT DOCUMENTS

| | | | |
|---|---|---|---|
| JP | 2003511288 A | | 3/2003 |
| JP | 2006227811 A | * | 8/2006 |
| JP | 2006260217 A | * | 9/2006 |
| JP | 2008293099 A | * | 12/2008 |
| JP | 2009086788 A | * | 4/2009 |
| JP | 2010134656 A | * | 6/2010 |

OTHER PUBLICATIONS

Google Translation of JP 2010-134656.*
JPO machine translation of JP 2010-134656 (original JP document published Jun. 17, 2010).*
Google Translation of JP 2010-134656 (original JP document published Jun. 17, 2010).*
PCT Notification of Transmittal of The International Search Report and The Written Opinion of The International Searching Authority, or the Declaration, for PCT/US2011/054157, Sep. 30, 2011, 9 pages.

* cited by examiner

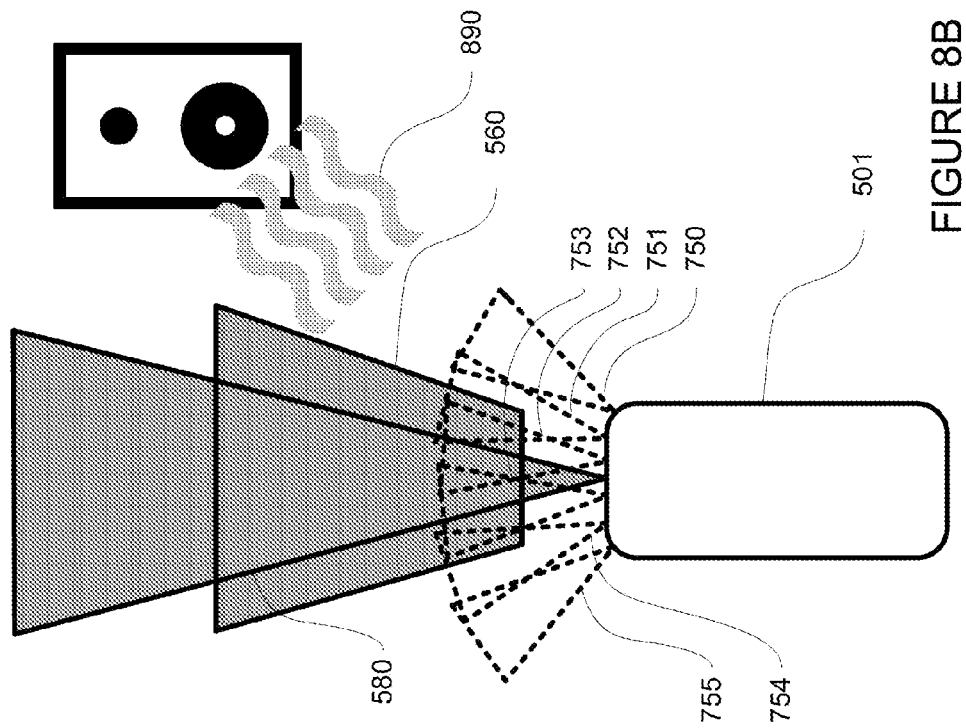
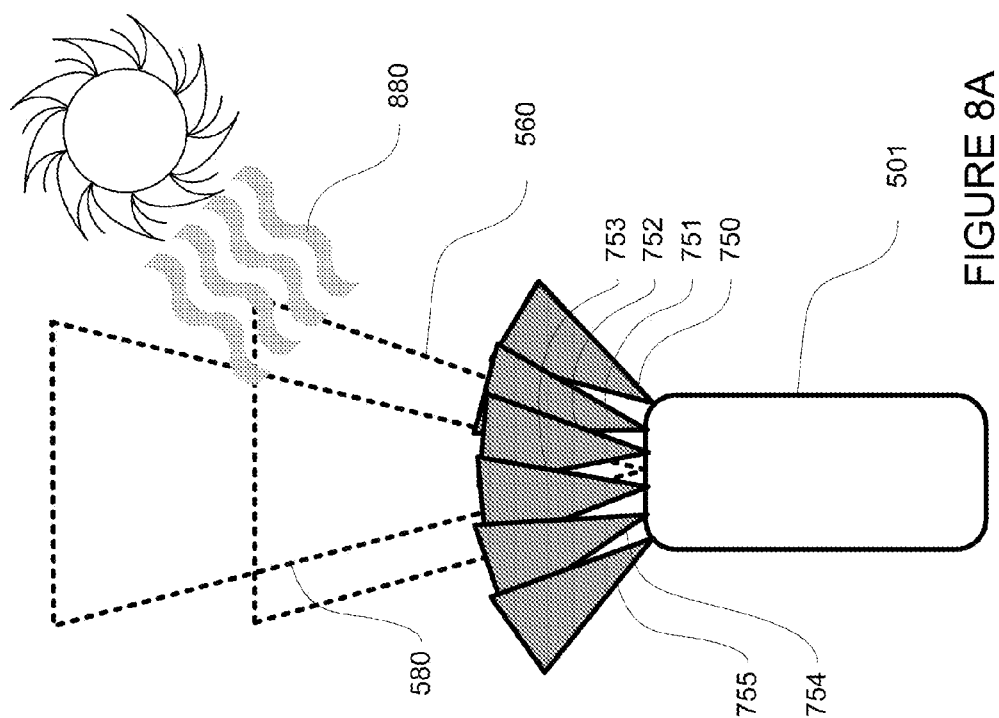

SENSOR FIELD SELECTION

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build 3D models of the objects detected in the vehicle's surrounding.

BRIEF SUMMARY

One aspect of the disclosure provides a method for controlling a vehicle having an autonomous operation mode. The method includes controlling, by a processor, operation of the vehicle based on a first control strategy; identifying a sensor field based on a field of view of one or more sensors of the vehicle; receiving sensor data from selected ones of the one or more sensors; identifying a change in sensor perception of the one or more sensors based on the sensor data, the change in the sensor perception including a diminished ability to detect objects within the sensor field; determining a second control strategy based on the change; and controlling, by the processor, the operation of the vehicle based on the second control strategy.

In one example, the method also includes detecting an object and a location of the object in the sensor field based on the received sensor data and identifying the change is based on the location of the object. In another example, identifying the change in sensor perception includes calculating an area of diminished sensor perception based on the location of the object in the sensor field, and determining the second control strategy is based on the area of diminished sensor perception. In another example, identifying the change in sensor perception includes calculating a current sensor field based on the location of the object in the sensor field, and determining the second control strategy is based on the current sensor field. In another example, the object is another vehicle. In another example, the method also includes determining that the sensor data indicates that a given one of the one or more sensors is providing unreliable information; and identifying the change is based on the determined indication. In another example, the unreliable information includes one or more camera images. In another example, the method also includes determining that there is no longer a change in sensor perception of the one or more sensors based on the sensor data; controlling the operation of the vehicle is further based on the first control strategy based on the determination that there is no longer a change. In another example, controlling the operation of the vehicle based on the first control strategy includes maneuvering the vehicle in a first direction, and controlling the operation of the vehicle based on the second control strategy includes maneuvering the vehicle in a second direction different from the first direction. In another example, controlling the operation of the vehicle based on the first control strategy includes maneuvering the vehicle at a first speed and wherein controlling the operation of the vehicle based on the second control strategy includes maneuvering the vehicle at a second speed different from the first speed.

Another aspect of the disclosure provides a device for controlling a vehicle having an autonomous operation mode. The device includes one or more sensors for detecting objects in the vehicle's surroundings and a processor coupled to the one or more sensors. The processor is operable to control operation of the vehicle based on a first control strategy; identify a sensor field based on a field of view of the one or more sensors of the vehicle; receive sensor data from selected ones of the one or more sensors; identify a change in sensor perception of the one or more sensors based on the sensor data, the change in the sensor perception including a diminished ability to detect objects within the sensor field; determine a second control strategy based on the change; and control the operation of the vehicle based on the second control strategy.

In one example, the processor is further operable to detect an object and a location of the object in the sensor field based on the received sensor data and the processor identifies the change based on the location of the object. In another example, the processor is operable to identify the change in sensor perception by calculating an area of diminished sensor perception based on the location of the object in the sensor field, and determining the second control strategy is based on the area of diminished sensor perception. In another example, the processor is operable to identify the change in sensor perception by calculating a current sensor field based on the location of the object in the sensor field, and determining the second control strategy is based on the current sensor field. In another example, the processor is further operable to identify the object as another vehicle. In another example, the processor is further operable to determine that the sensor data indicates that a given one of the one or more sensors is providing unreliable information, and the processor identifies the change based on the determined indication. In another example, the unreliable information includes one or more camera images. In another example, the processor is also operable to determine that there is no longer a change in sensor perception of the one or more sensors based on the sensor data and to control the operation of the vehicle based on the first control strategy based on the determination that there is no longer a change. In another example, the processor is also operable to control the operation of the vehicle based on the first control strategy by maneuvering the vehicle in a first direction and to control the operation of the vehicle based on the second control strategy by maneuvering the vehicle in a second direction different from the first direction. In another example, the processor is also operable to control the operation of the vehicle based on the first control strategy by maneuvering the vehicle at a first speed and to control the operation of the vehicle based on the second control strategy by maneuvering the vehicle at a second speed different from the first speed.

Yet another aspect of the disclosure provides a tangible computer-readable storage medium on which computer readable instructions of a program are stored, the instructions, when executed by a processor, cause the processor to perform a method of controlling a vehicle having an autonomous operation mode. The method includes controlling, by a processor, operation of the vehicle based on a first control strategy; identifying a sensor field based on a field of view of one or more sensors of the vehicle, the change in the sensor perception including a diminished ability to detect objects within the sensor field; receiving sensor data from selected ones of the one or more sensors; identifying a change in sensor perception of the one or more sensors based on the sensor data; determining a second control strategy based on the change; and controlling, by the processor, the operation of the vehicle based on the second control strategy.

In one example, the method also includes detecting an object and a location of the object in the sensor field based on the received sensor data and identifying the change is based on the location of the object. In another example, identifying the change in sensor perception includes calculating an area of diminished sensor perception based on the location of the object in the sensor field, and determining the second control strategy is based on the area of diminished sensor perception. In another example, identifying the change in sensor perception includes calculating a current sensor field based on the location of the object in the sensor field, and determining the second control strategy is based on the current sensor field. In another example, the object is another vehicle. In another example, the method also includes determining that the sensor data indicates that a given one of the one or more sensors is providing unreliable information; and identifying the change is based on the determined indication. In another example, the unreliable information includes one or more camera images. In another example, the method also includes determining that there is no longer a change in sensor perception of the one or more sensors based on the sensor data; controlling the operation of the vehicle is further based on the first control strategy based on the determination that there is no longer a change. In another example, controlling the operation of the vehicle based on the first control strategy includes maneuvering the vehicle in a first direction, and controlling the operation of the vehicle based on the second control strategy includes maneuvering the vehicle in a second direction different from the first direction. In another example, controlling the operation of the vehicle based on the first control strategy includes maneuvering the vehicle at a first speed and wherein controlling the operation of the vehicle based on the second control strategy includes maneuvering the vehicle at a second speed different from the first speed.

BRIEF DESCRIPTION OF THE DRAWINGS

FIGS. 8A-B are diagrams of an autonomous vehicle in accordance with an exemplary embodiment.

DETAILED DESCRIPTION

Figure 1:
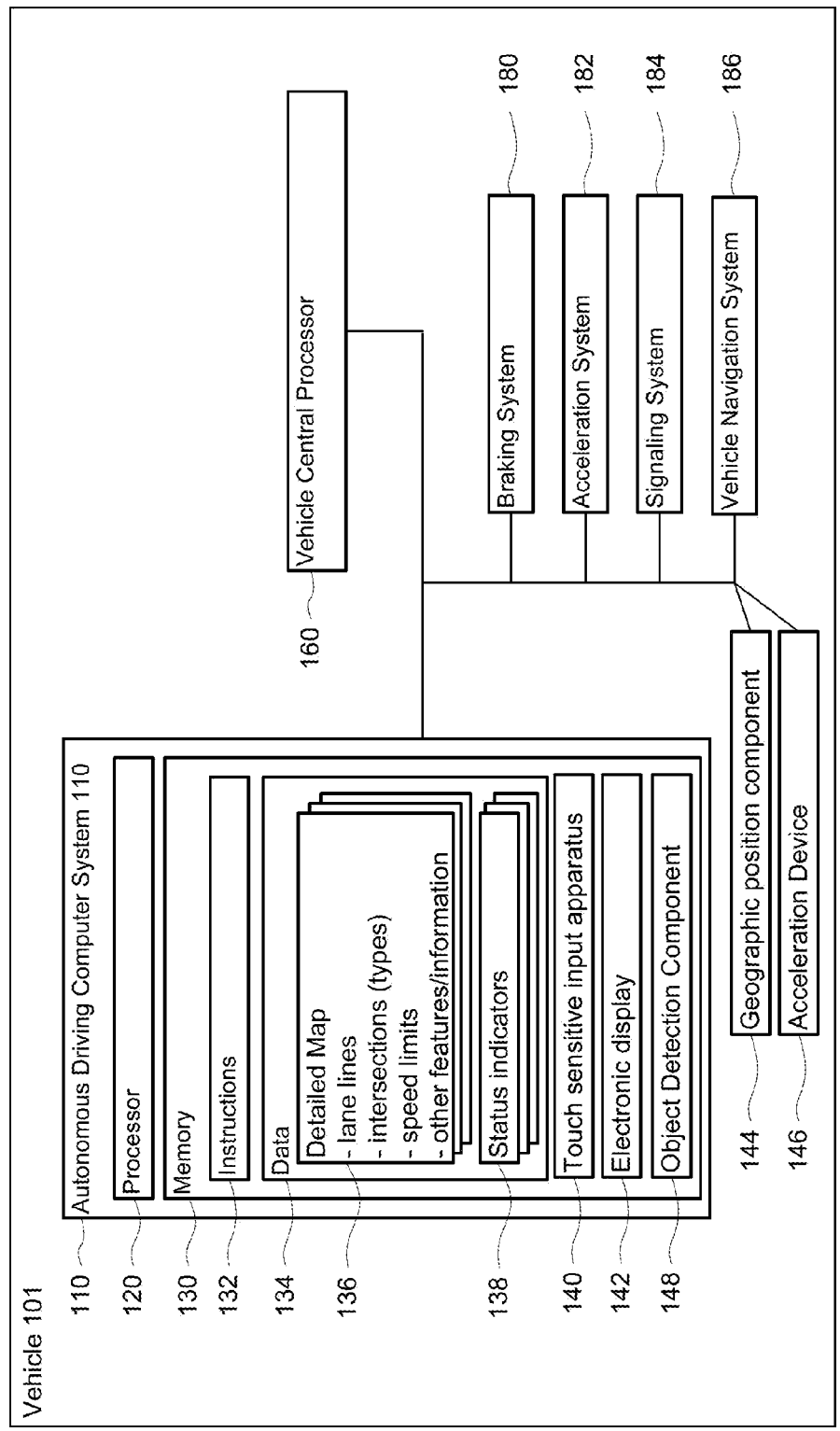
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
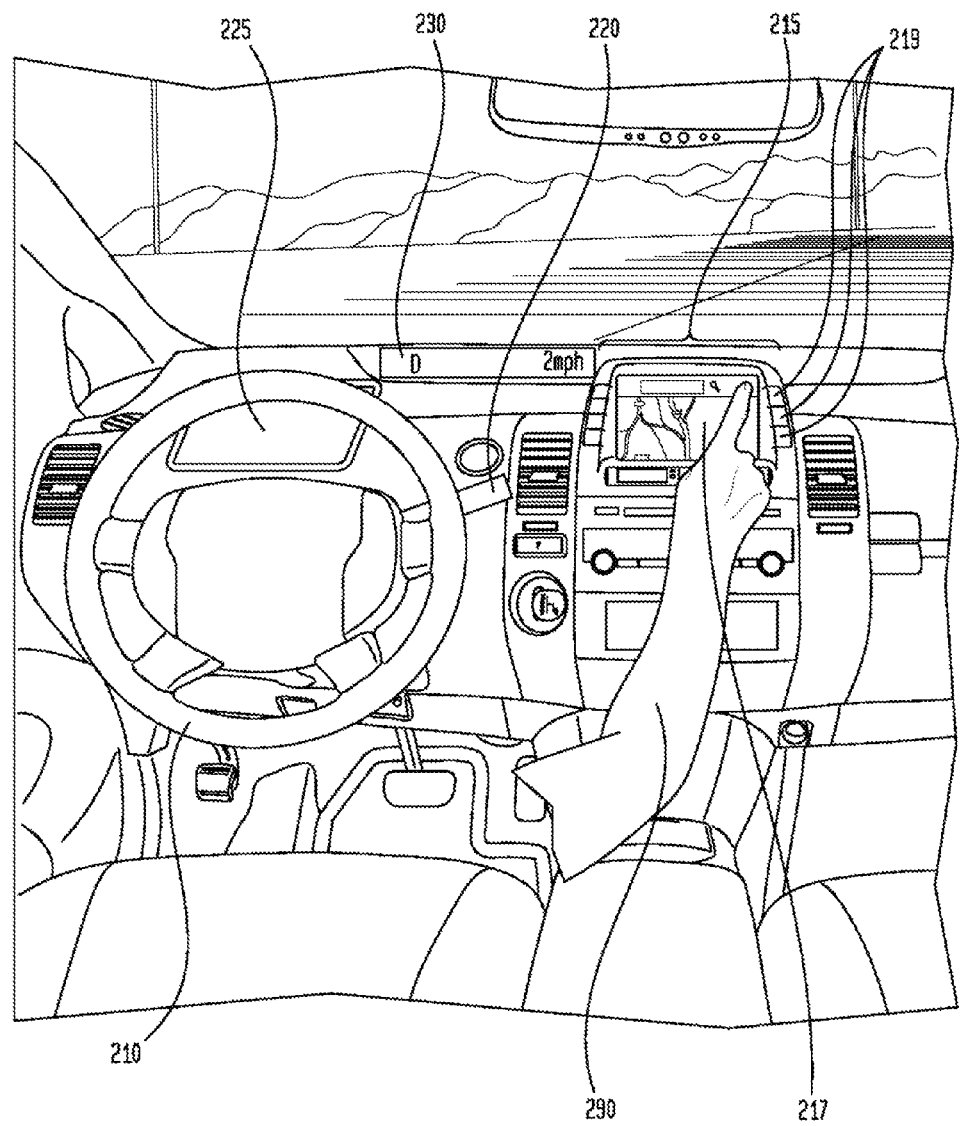
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location.

Figure 3:
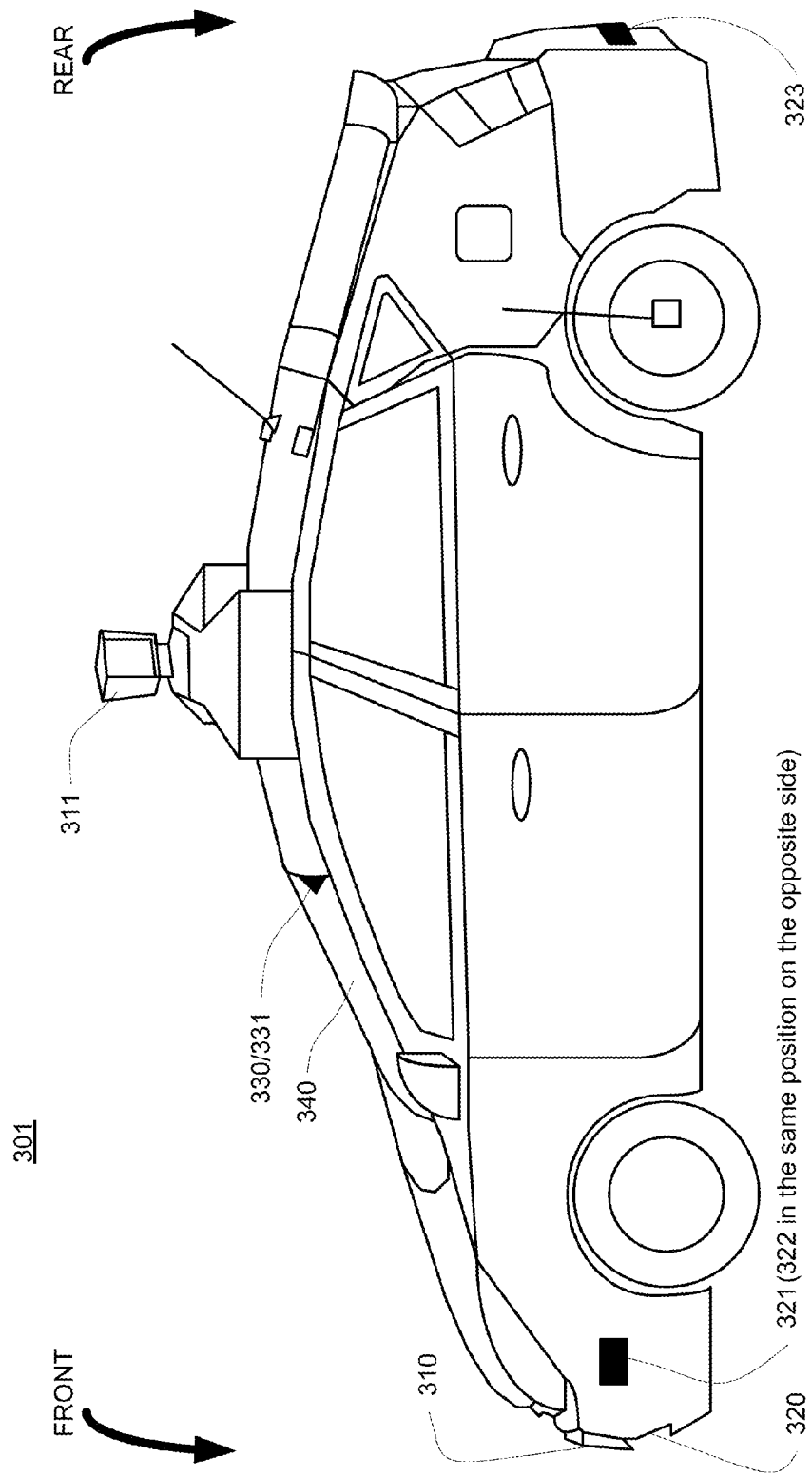
FIG. 3 is an exterior of an autonomous vehicle in accordance with an exemplary embodiment

As shown in FIG. 3, small passenger vehicle 301 may include lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
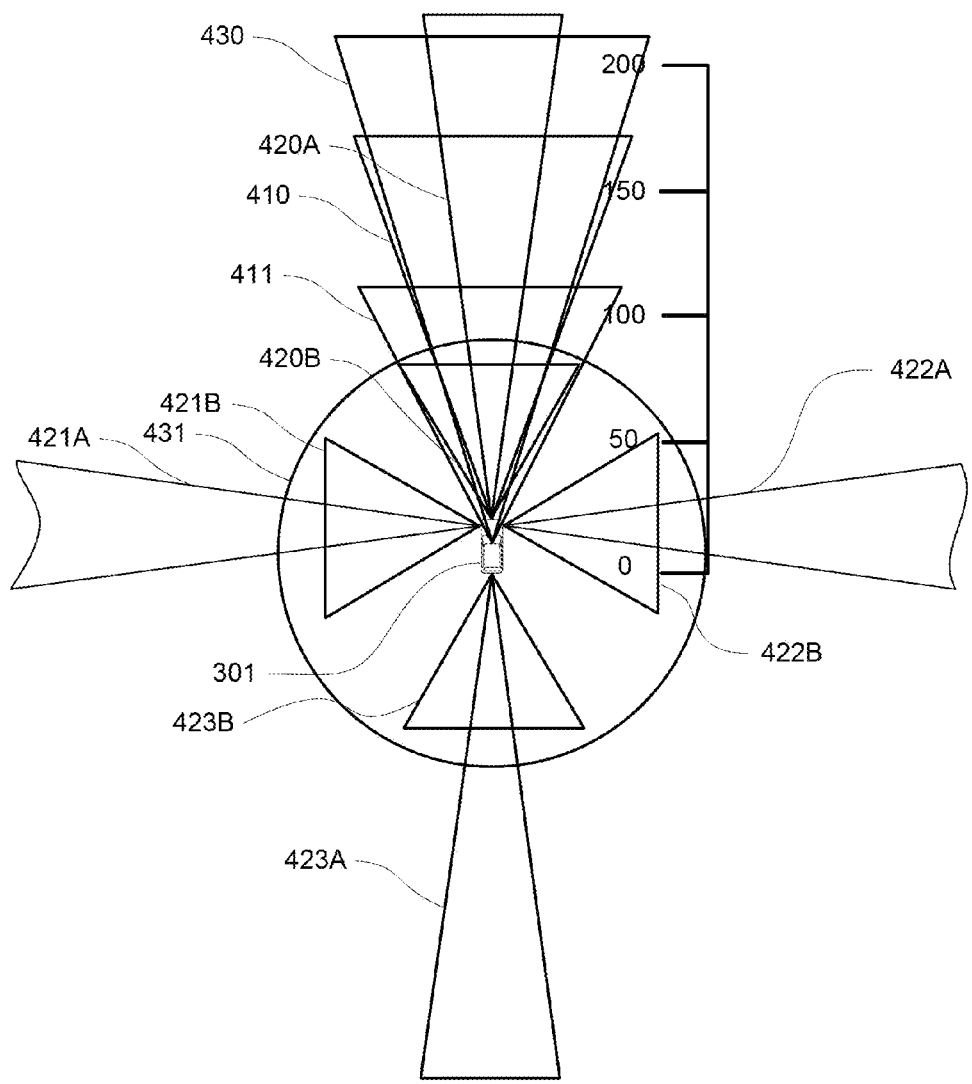
FIGS. 4A-D are diagrams of an autonomous vehicle in accordance with an exemplary embodiment.

Each sensor may be associated with a particular sensor field in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 150 meters, and sensor field 411 includes a 360 degree horizontal field of view for approximately 80 meters.

Figure 4D:
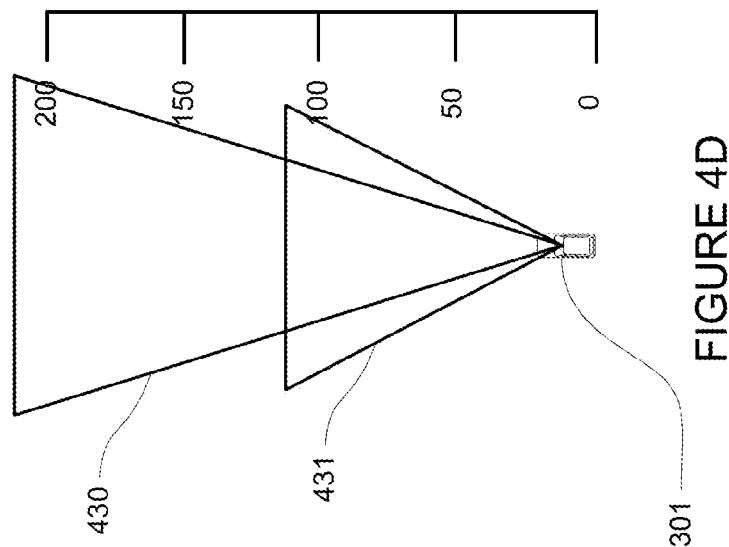
Figure 4B:
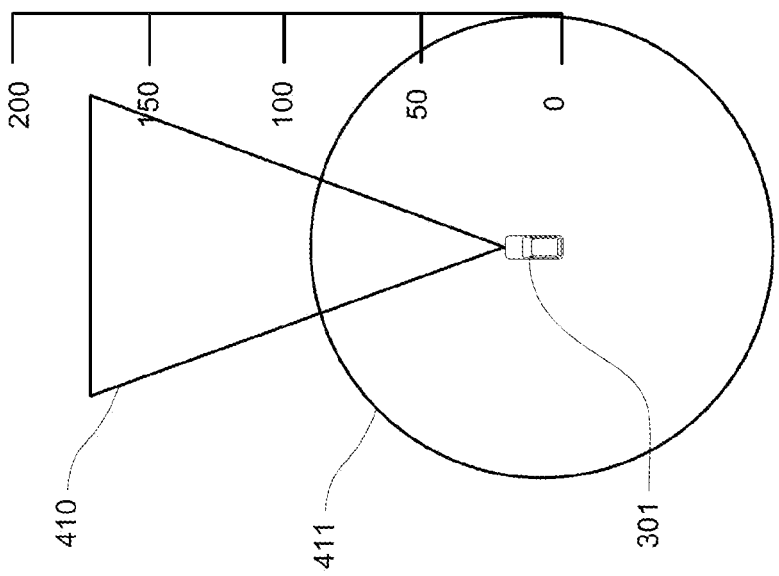
Figure 4C:
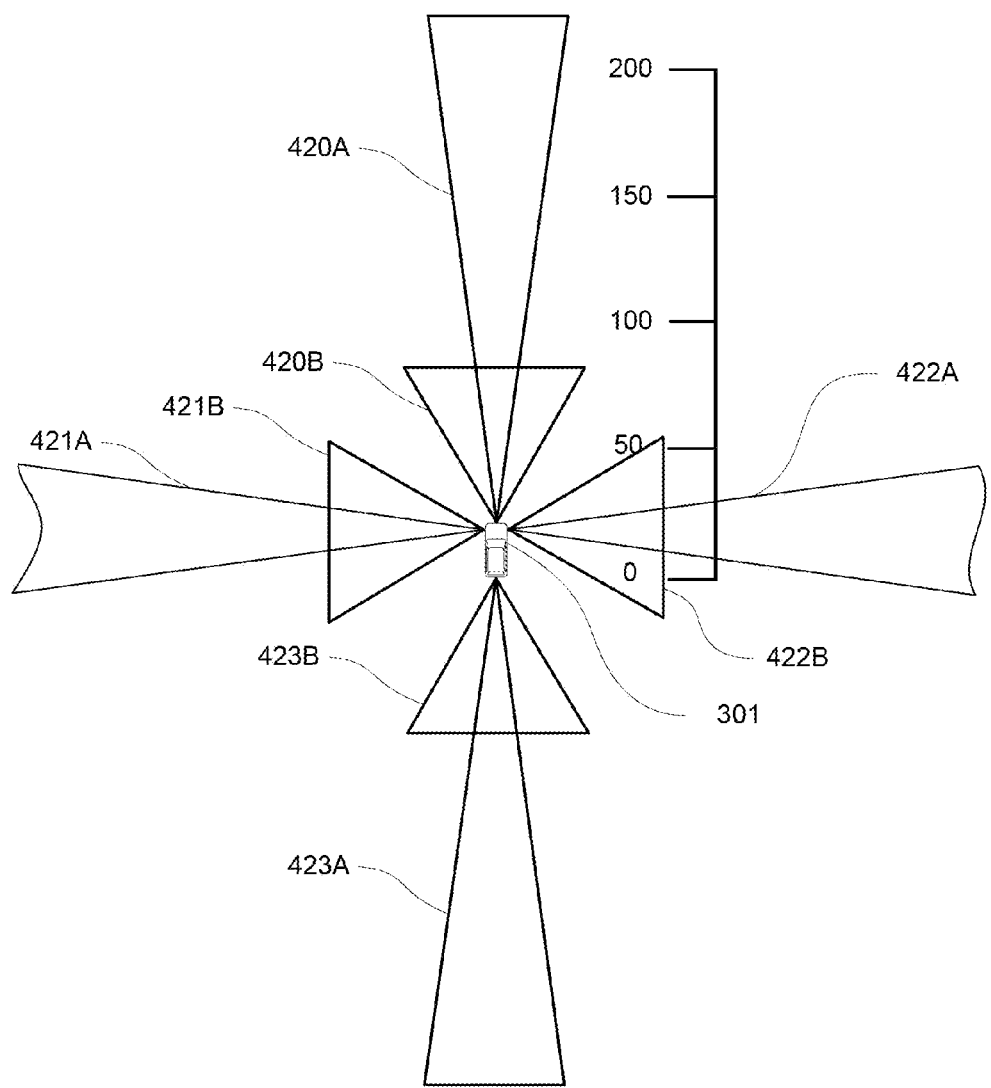

FIG. 4C depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4C.

FIG. 4D depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In another example, an autonomous vehicle may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters.

Figure 5A:
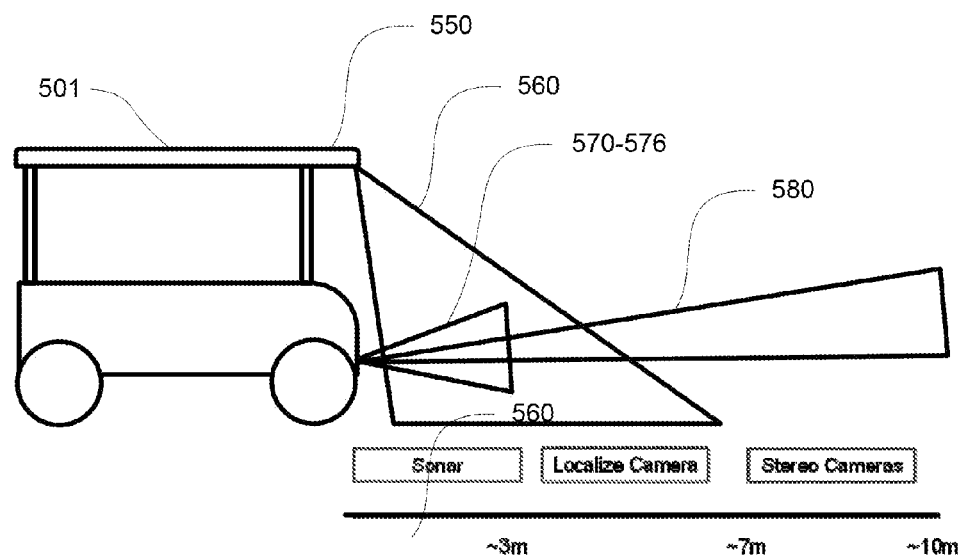
FIGS. 5A-B are diagrams of an autonomous vehicle in accordance with an exemplary embodiment.
Figure 5B:
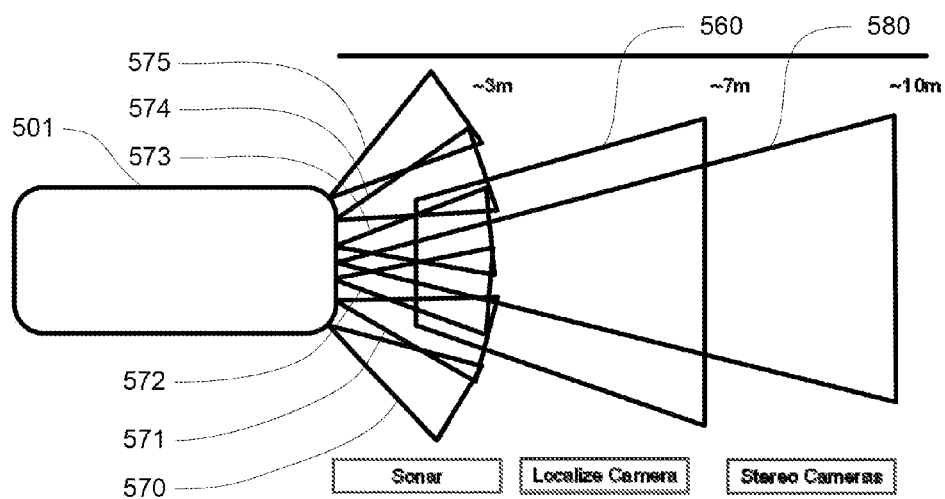

In one example, the vehicle 101 may be a small cart, such as a golf cart. FIGS. 5A-5B are a side and top-down view of small cart 501 and a set of exemplary fields of view which make up a sensor field of the cart. Small cart 501 may include sensors such as sonar, stereo cameras, and a localization camera. The localization camera may be used to localize the vehicle to centimeter accuracy on a map of the map information. Each of these sensors may result in a field of view extending for some distance at some horizontal and vertical degrees. For example, cart 501 may include a localization camera mounted on the front of the cart which results in a sensor field 560 with a horizontal field of view of approximately 35 degrees which ranges approximately 1.5 to 7 meters in front of the cart. The cart may also have a plurality of sonar detection devices mounted across the front of the cart. These sonar devices may be used to detect objects by transmitting and receiving sound waves at a particular frequency of range of frequencies. Each of these devices may result in a sensor field, such as sensor fields 570-575, each with a horizontal field of view of approximately 35 degrees which range approximately 3 meters in front of the cart. Cart 501 may also include stereo camera mounted in the front of the cart. The stereo cameras may result in a sensor field 580, each with a horizontal field of view of approximately 30 degrees which ranges approximately 10 meters from the front of the cart.

In another example, where the cart includes a localization camera, a stereo camera, and one or more sonar detection devices, the cart cart's localization camera may include a horizontal field of view of approximately 75 degrees, a vertical field of view of approximately 90 degrees, and a range of approximately 10 meters. The overlapping region of the stereo cameras may include a horizontal field of view for approximately 50 degrees, a vertical field of view for approximately 10 degrees, and a range of approximately 30 meters. The sonar detection devices may each have a horizontal field of view of approximately 60 degrees and a range of approximately 6 meters.

The aforementioned sensors may allow the vehicle to evaluate and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, breake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

In addition to the operations described above and illustrated in the figures, various operations will now be described. It should be understood that the following operations do not have to be performed in the precise order described below. Rather, various steps can be handled in a different order or simultaneously, and steps may also be added or omitted.

An autonomous vehicle may transport itself, passengers, and/or cargo between two locations by following a route. For example, a driver may input a destination and activate an autonomous mode of the vehicle. In response, the vehicle's computer may calculate a route based on the roadgraph, its current location, and the destination. Based on the route (or as part of the route generation), the vehicle may determine a control strategy for controlling the vehicle along the route to the destination. For example, the control strategy may include where to turn, at what speeds to travel, where to look for traffic signals, where to stop for intersections or stop signs, etc.

As explained above, while following the route, the vehicle may detect objects in its surroundings which are within the sensor fields. In response to detecting objects, the computer may adjust the autonomous vehicle's speed or change direction. In some examples, however, the sensor fields may be changed or become less reliable based on objects or other features in the vehicle's surroundings.

Figure 6A:
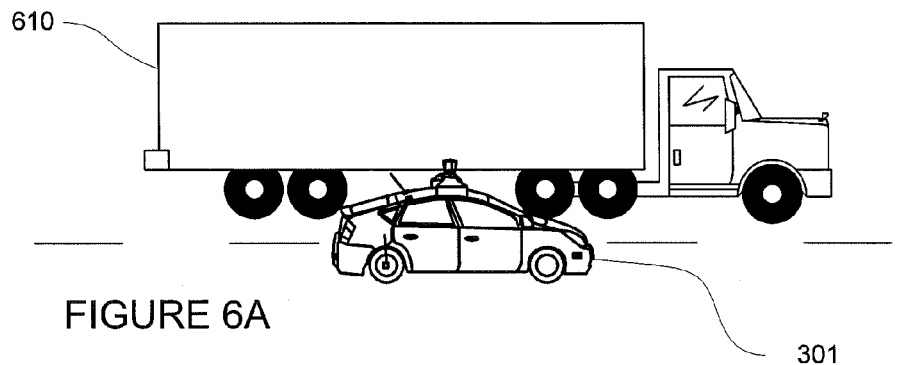
FIGS. 6A-B are diagrams of an autonomous vehicle in accordance with an exemplary embodiment.
Figure 6B:
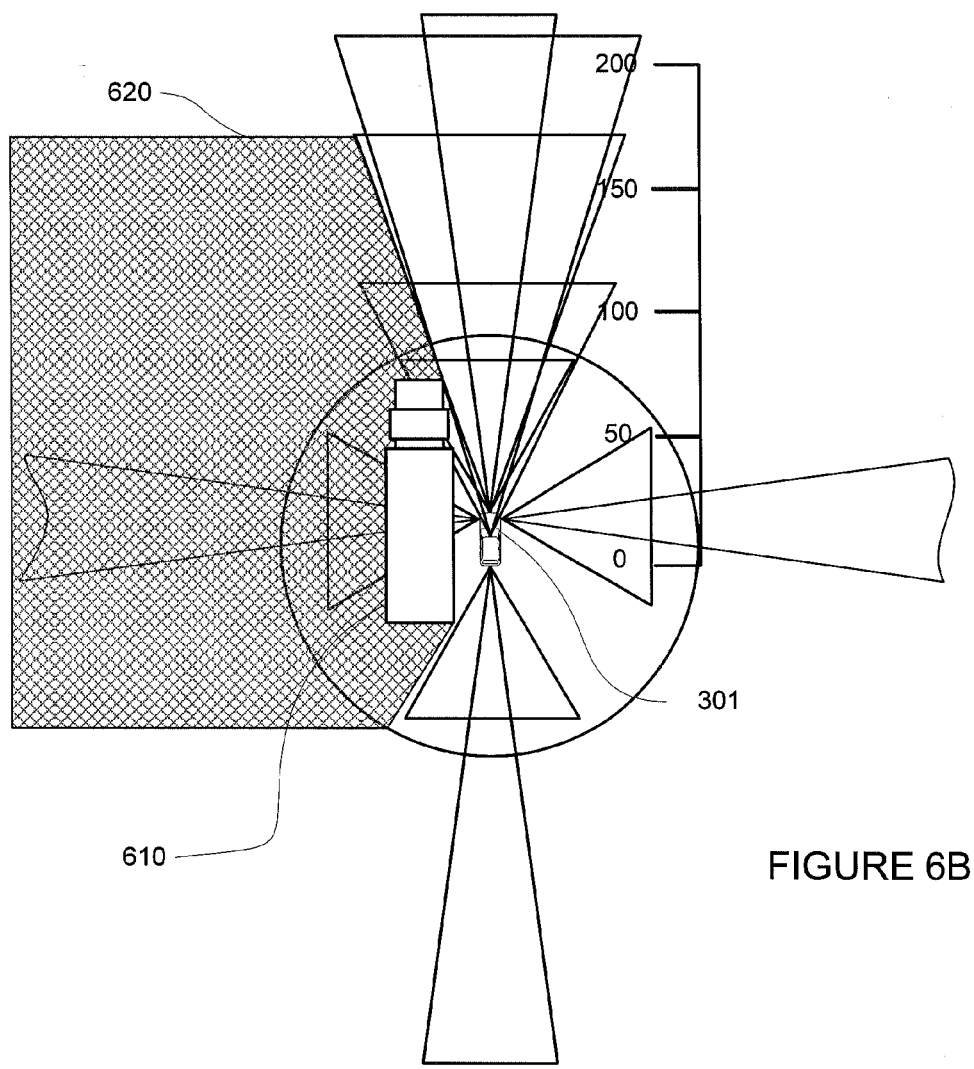
Figure 7A:
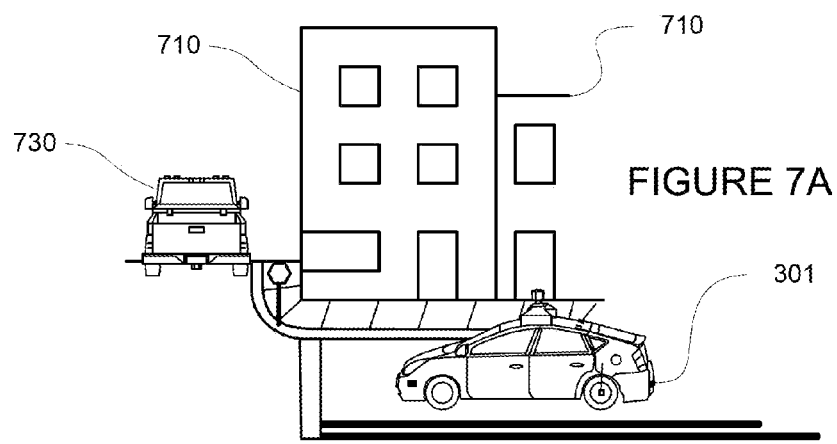
FIG. 7A-B are diagrams of an autonomous vehicle in accordance with an exemplary embodiment.

An object may occupy a portion of the vehicle's sensor field. For example, as shown in FIG. 6A, vehicle 301 may be driving along side of another large, moving object such as a tractor-trailer 610. As shown in FIG. 6B, tractor-trailer 610 occupies an area 620 within vehicle 301's sensor field. In another example, shown in FIG. 7A, vehicle 301 is driving alongside buildings 710 and approaching a bend in the road. These buildings occupy an area 720 within vehicle 301's sensor field.

When an object occupies a portion of a vehicle's sensor field, the object's presence may change the perception of one or more sensors, for example by limiting the perception of other objects. The vehicle's computer may no longer be able to accurately detect other objects which are in the area behind the object or not within a sensor's line of detection. In some examples, if the object is translucent or transparent, such as glass, the sensors may be able to detect "though" some objects, but with much less accuracy than if the object was not present. Thus, the size and accuracy of the vehicle's sensor field may be diminished. As a result, the vehicle's computer may calculate the size and shape of the area of sensor diminution and a new or current sensor field based on this area of diminution.

For example, returning to FIG. 6B, the computer may identify tractor-trailer 610 as an object and calculate the size and shape of area 620, the size and shape of the sensor field within area 620, and/or the size and shape of the sensor field which is not within area 620. Any objects within area 620 are no longer detectable by vehicle 301's sensors. This area represents an approximate area of "blindness." The computer may be able to estimate the location of objects based on information from the roadgraph, or for example, if the computer is tracking an object which has recently entered the area. For example, sonar, laser or camera sensors would not be able to collect data which is within area 620 because the tractor-trailer is opaque. This prevents the sensors from collecting information "through" the truck.

Figure 7B:
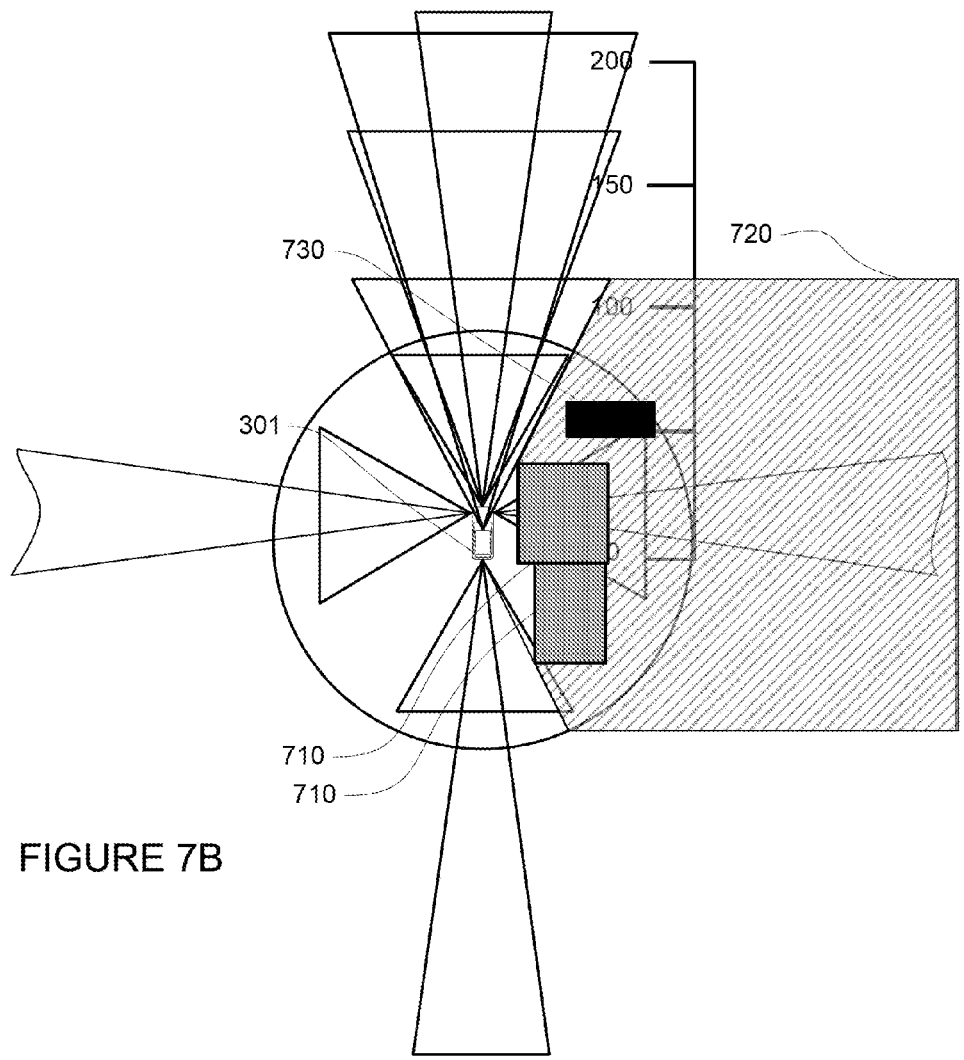

Returning to the example of FIG. 7, the vehicle's sensor field is affected by the buildings. The vehicle's computer may identify the buildings as objects and calculate the size and shape of area 720, the size and shape of the sensor field within area 720, and/or the size and shape of the sensor field which is not within area 720. In this example, the vehicle is unable to detect truck 730 which is parked alongside of the buildings 710, but within area 720. For example, the location of vehicle 730 is also shown within area 720 of FIG. 7B.

In addition to objects, other situations may affect an autonomous vehicle's sensor field by reducing or inhibiting one or more sensor's perception of the vehicle's surroundings. For example, in the bright sunlight, camera images may become saturated and less reliable. Thus, cart 501's sensor field is diminished as bright effects the effectiveness of the cameras. Thus, as indicated in FIG. 8a, because of bright light 880, fields of view 560 and 580 of the camera sensors are no longer able to detect objects. Accordingly, these fields of view are shown in dashed line. As with the object examples described above, the size and accuracy of the cart's sensor field may be diminished. The cart's computer may then calculate a new sensor field, for example, based only on sonar detection devices 750-755 or may simply determine that it the cart may rely only on the sensor field from the sonar devices' fields of view.

In another example, sounds 890 of FIG. 8B are at or near the frequency or range of frequencies used by the cart's sonar devices. For example, the sounds may be generated by other sonar devices or noises near the vehicle. These sounds may result in feedback which causes the sonar data to become less reliable for detecting objects. Thus, fields of view 750-755 of the sonar detection devices are no longer able to detect objects. Accordingly, these fields of view are shown in dashed line. The cart's computer may calculate a new sensor field, for example, based only on camera devices 560 and 580 or may simply determine that it the cart may rely only on it's sensor field from the cameras' fields of view.

In response to identifying the change in the sensor field, the vehicle's computer may change the control strategies of the vehicle. For example, rather than maintaining the vehicle's speed and direction, the vehicle's computer may have the vehicle slow down, maintain a lane, speed up (though with consideration of the speed limit), or take other responsive action. In another example, rather than slowing down to a first speed in order to take an action required for the route, such as a turn, the computer may slow the vehicle down to a second, much lower speed. In some examples, the vehicle may not need to take any specific action but may maintain its present speed and direction.

In one example, returning to FIG. 6A, vehicle 301 may be following a route which requires it to move one or more lanes to the left (towards tractor-trailer 610). Ordinarily, if the vehicle was traveling faster than the tractor-trailer, vehicle 301 may wait until it has passed tractor-trailer 610 to change lane. However, after the vehicle's computer has determined area of sensor diminution or the current sensor field, the computer may slow the vehicle down so that it falls behind the tractor-trailer in order to increase the sensor field so that vehicle 301 may detect objects to the left of tractor-trailer 610.

Returning to FIG. 7A, in another example, vehicle 301 may be following a route which requires it follow the road around the building. Ordinarily, if the vehicle was traveling around a bend, the computer may maintain the vehicle's speed. However, after the vehicle's computer has determined area of sensor diminution or the current sensor field, the computer may slow the vehicle down dramatically so that when the vehicle's sensor field is able to detect an object located near truck 730, the vehicle may have sufficient time to take any necessary action to avoid the object.

Similarly, in the example of FIG. 8A, if the cart is no longer able to rely on the camera sensors, it may slow down dramatically such that if an object is detected within the approximately 3 meter range of the sonar field of view, cart 501 has sufficient time to stop or move around the object. If the cart's sensor field is limited to the camera fields of view, as shown in FIG. 8B, cart 501 may again slow down dramatically before taking a turn. In this example, if the cart would have maintained its speed before the sonar detection device's effectiveness had become diminished, cart 501 may continue to maintain its speed, slow down slightly, or even increase its speed.

An autonomous vehicle's computer may continuously or periodically determine whether its sensor field has changed and take action, or change its control strategy, accordingly. For example, returning to FIG. 7A, if vehicle 301 has moved around the bend in the roadway and passed truck 710, the vehicle's computer may return to the original control strategy and increase its speed again. Similarly, if cart 501 (of FIG. 8A) moves into a shaded area where light 880 no longer has the same effect on the camera sensor, the cart's computer may again rely on the cameras to detect objects, return to the original control strategy, and increase its speed. This cycle of adjustments to speed and maneuvering and changing control strategies may occur continuously based on the area of diminution or the current sensor field of the vehicle.

Figure 9:
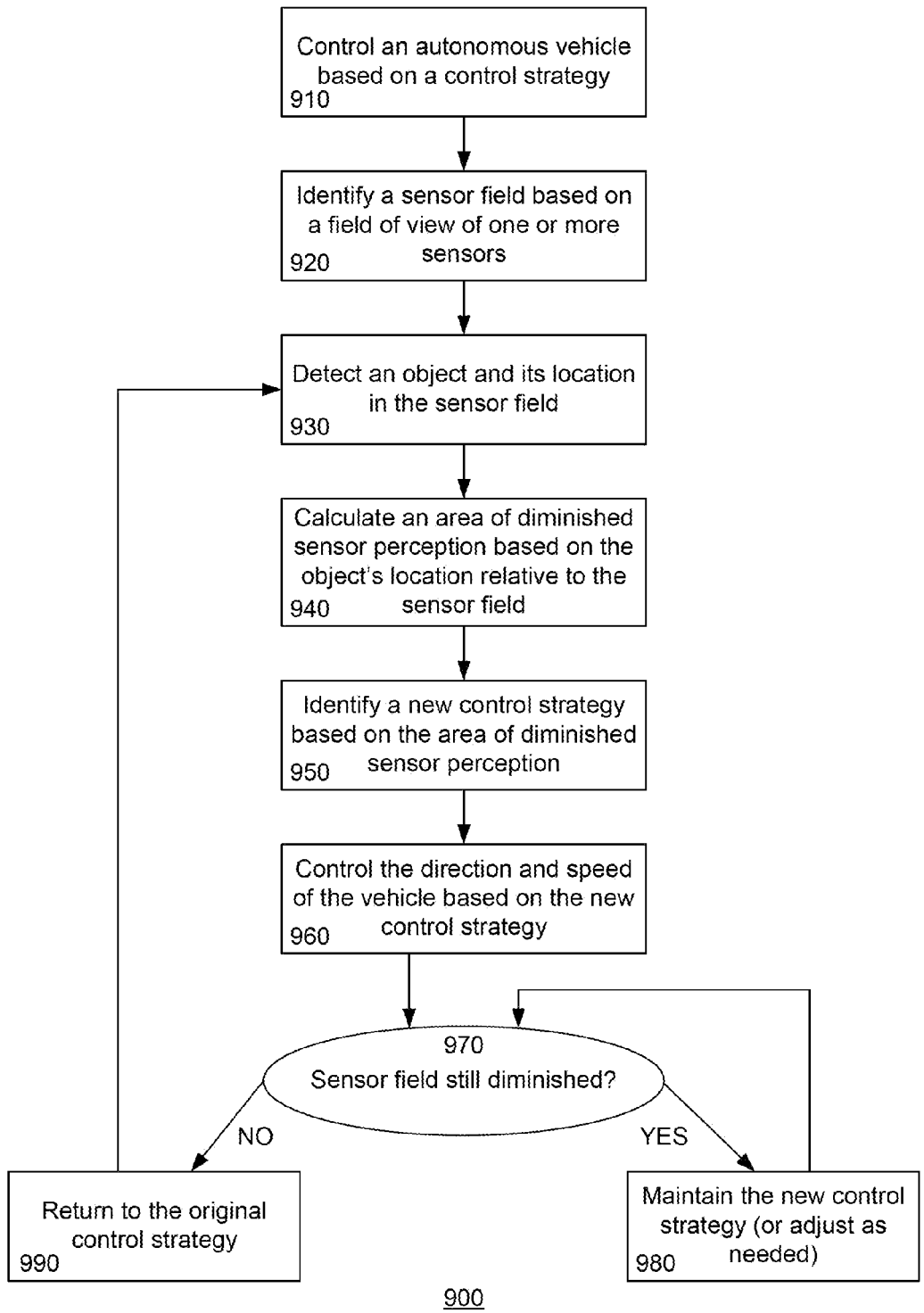
FIG. 9 is flow diagram in accordance with an exemplary embodiment.

Flow diagraph 900 of FIG. 9 is another example of controlling an autonomous vehicle as described above. The vehicle's computer controls the autonomous vehicle based on a control strategy at block 910. A sensor field is identified based on a field of view or views of one or more of the autonomous vehicle's sensors at block 920. An object and its location in the sensor field are detected at block 930. For example, data from one or more sensor may be received and processed by the vehicle's computer in order to identify the object and its location. An area of diminished sensor perception is calculated based on the object's location relative to the sensor field at block 940. A new control strategy is then identified based on the current sensor field at block 950. The computer may then control the direction and speed of the vehicle based on the area of diminished sensor perception at block 960. The computer then determines whether or not the sensor field continues to be diminished at block 970. If the sensor field continues to be diminished, the computer may maintain the new control strategy or adjust the control strategy as needed at block 980 and then returns to block 970. Once the vehicle's sensor field is determined to no longer be diminished, the computer again controls the autonomous vehicle based on the original control strategy at block 990 and returns to block 930 when a new object is identified.

Figure 10:
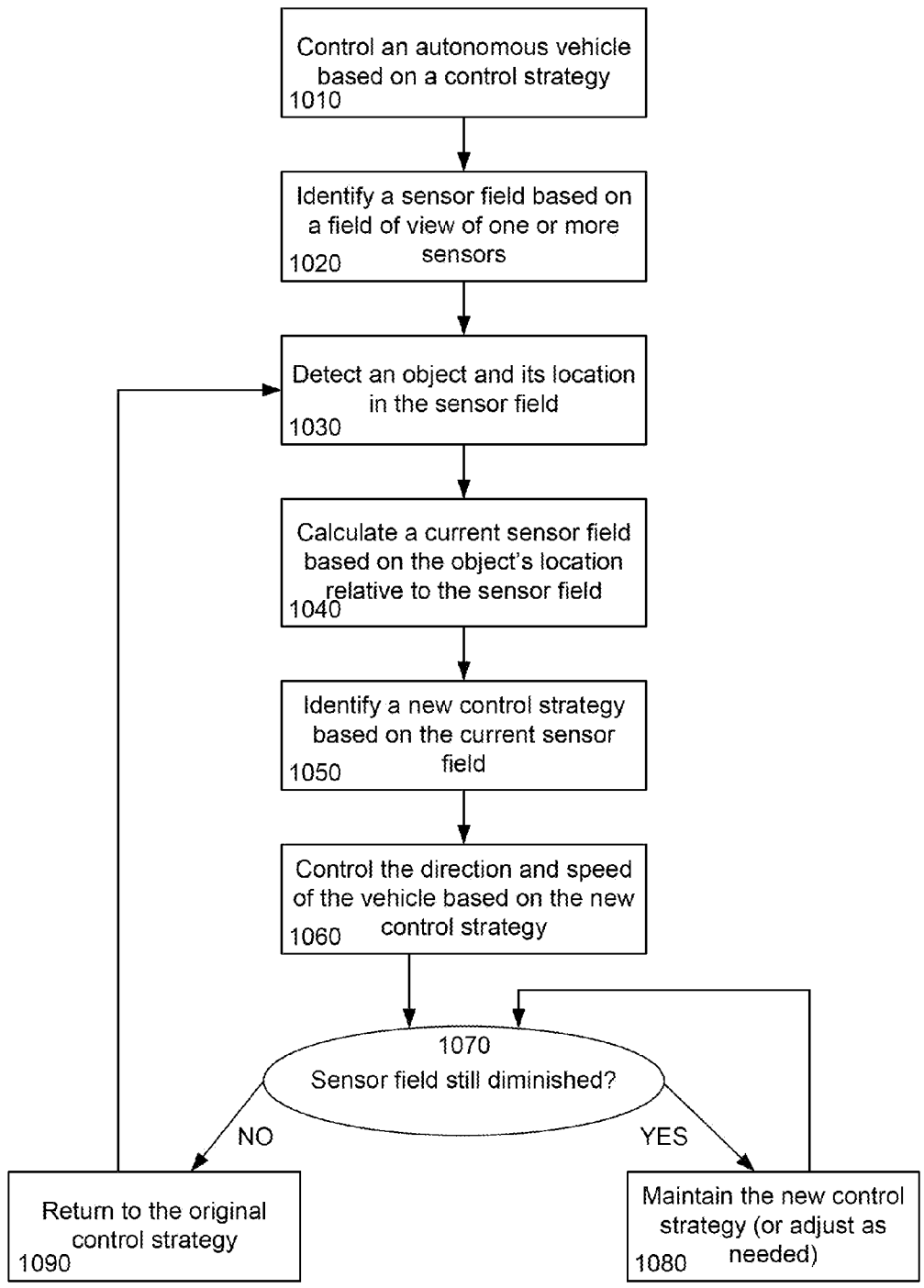
FIG. 10 is flow diagram in accordance with an exemplary embodiment.

Flow diagraph 1000 of FIG. 10 is yet another example of controlling an autonomous vehicle as described above. The vehicle's computer controls the autonomous vehicle based on a control strategy at block 1010. A sensor field is identified based on a field of view or views of one or more of the autonomous vehicle's sensors at block 1020. An object and its location in the sensor field are detected at block 1030. For example, data from one or more sensor may be received and processed by the vehicle's computer in order to identify the object and its location. A current sensor field is calculated based on the object's location relative to the sensor field at block 1040. A new control strategy is then identified based on the current sensor field at block 1050. The computer may then control the direction and speed of the vehicle based on the new control strategy at block 1060. The computer then determines whether or not the sensor field continues to be diminished at block 1070. If the sensor field continues to be diminished, the computer may maintain the new control strategy or adjust the control strategy as needed at block 1080 and then returns to block 1070. Once the vehicle's sensor field is determined to no longer be diminished, the computer again controls the autonomous vehicle based on the original control strategy at block 1090 and returns to block 1030 when a new object is identified.

Figure 11:
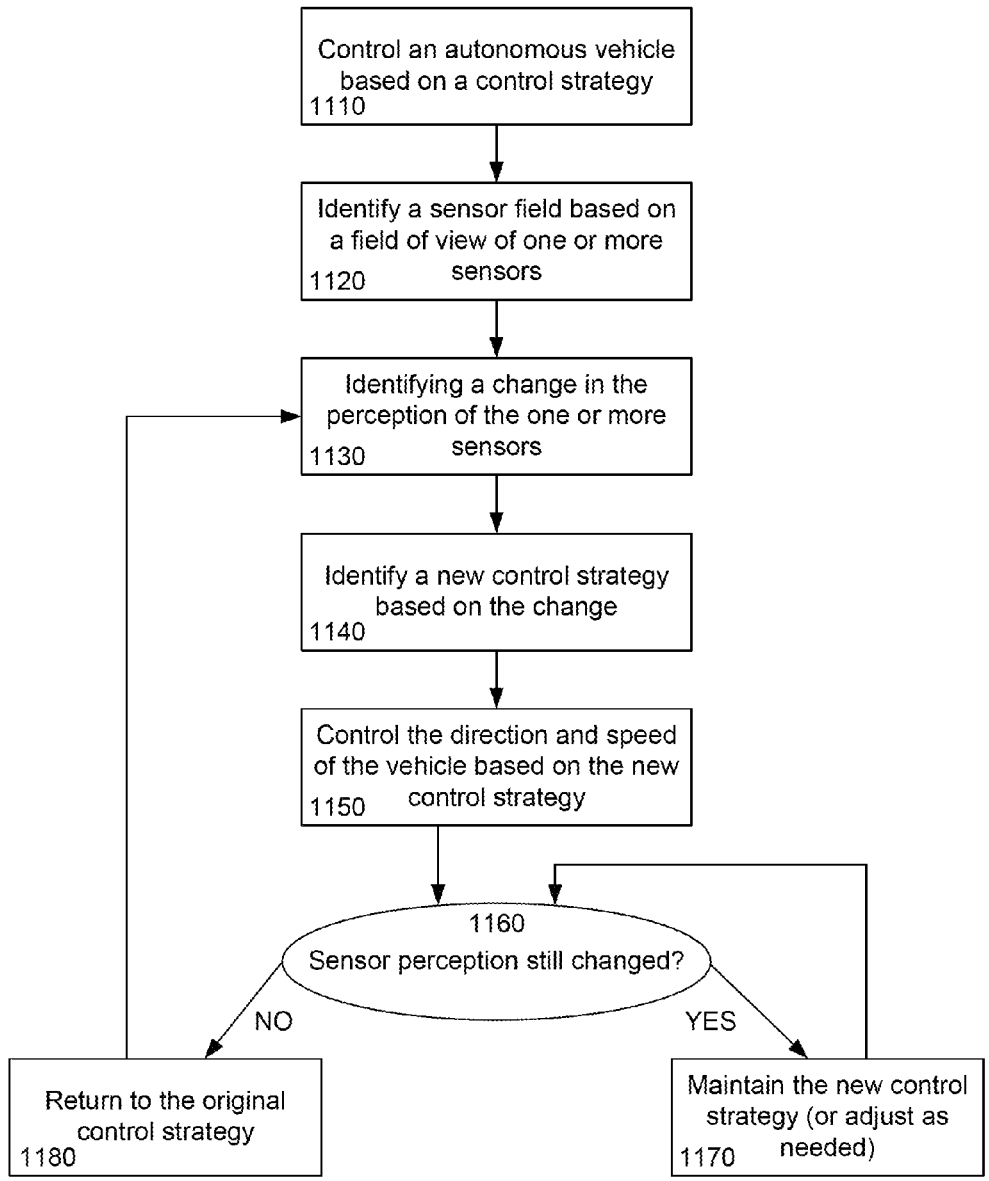
FIG. 11 is flow diagram in accordance with an exemplary embodiment.

Flow diagraph 1100 of FIG. 11 is a further example of controlling an autonomous vehicle as described above. The vehicle's computer controls the autonomous vehicle based on a control strategy at block 1110. A sensor field is identified based on a field of view or views of one or more of the autonomous vehicle's sensors at block 1120. A change in the perception of one or more sensors is identified at block 1130. For example, data from one or more sensor may be received and processed by the vehicle's computer which indicates that the data from one or more of the sensors is unreliable. A new control strategy is then identified based on the change at block 1140. The computer may then control the direction and speed of the vehicle based on the new control strategy at block 1150. The computer then determines whether or not the change is still in effect at block 1160, for example, by receiving additional data from the sensors. If the change persists, the computer may maintain the new control strategy or adjust the control strategy as needed at block 1170 and then returns to block 1160. Once the computer determines that there is no longer a change, the computer again controls the autonomous vehicle based on the original control strategy at block 1180 and returns to block 1130 when a new object is identified.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:
1. A method for controlling a vehicle having an autonomous operation mode, the method comprising:

controlling, by a processor, operation of the vehicle based on a first control strategy;
identifying a sensor field based on a field of view of one or more sensors of the vehicle;
receiving sensor data from selected ones of the one or more sensors;
detecting a moving object in the roadway and a location of the object in the sensor field based on the received sensor data;
identifying a change in sensor perception of the one or more sensors based on the location of the object, the change in the sensor perception including a decrease in an ability to detect objects within the sensor field;
determining, based on the change, a second control strategy for increasing the ability to detect objects within the sensor field; and
responsive to identifying the change, maneuvering, by the processor, the vehicle in the autonomous mode so that the vehicle falls behind the object according to the second control strategy in order to increase the ability to detect objects within the sensor field.

2. The method of claim 1, wherein identifying the change in sensor perception includes calculating an area of diminished sensor perception based on the location of the object in the sensor field, and determining the second control strategy is based on the area of diminished sensor perception.

3. The method of claim 1, wherein identifying the change in sensor perception includes calculating a current sensor field based on the location of the object in the sensor field, and determining the second control strategy is based on the current sensor field.

4. The method of claim 1, wherein the object is another vehicle.

5. The method of claim 1, further comprising:
determining that the sensor data indicates that a given one of the one or more sensors is providing unreliable information; and
wherein identifying the change is based on the determined indication.

6. The method of claim 5, wherein the unreliable information includes one or more camera images.

7. The method of claim 1, further comprising:
determining that there is no longer a change in sensor perception of the one or more sensors based on the sensor data;
wherein controlling the operation of the vehicle is further based on the first control strategy based on the determination that there is no longer a change.

8. The method of claim 1, wherein controlling the operation of the vehicle based on the first control strategy includes maneuvering the vehicle at a first speed and wherein controlling the operation of the vehicle based on the second control strategy includes maneuvering the vehicle at a second speed different from the first speed.

9. A device for controlling a vehicle having an autonomous operation mode, the device comprising:
one or more sensors for detecting objects in the vehicle's surroundings; and
a processor coupled to the one or more sensors, the processor being operable to:
control operation of the vehicle based on a first control strategy;
identify a sensor field based on a field of view of the one or more sensors of the vehicle;
receive sensor data from selected ones of the one or more sensors;
detect a moving object in the roadway and a location of the object in the sensor field based on the received sensor data;
identify a change in sensor perception of the one or more sensors based on the location of the object, the change in the sensor perception including a decrease in an ability to detect objects within the sensor field;
determine, based on the change, a second control strategy for increasing the ability to detect objects in the sensor field; and
responsive to identifying the change, maneuver the vehicle in the autonomous mode so that the vehicle falls behind the object according to the second control strategy in order to increase the ability to detect objects within the sensor field.

10. The device of claim 9, wherein the processor is operable to identify the change in sensor perception by calculating an area of diminished sensor perception based on the location of the object in the sensor field, and determining the second control strategy is based on the area of diminished sensor perception.

11. The device of claim 9, wherein the processor is operable to identify the change in sensor perception by calculating a current sensor field based on the location of the object in the sensor field, and determining the second control strategy is based on the current sensor field.

12. The device of claim 9, wherein the processor is further operable to identify the object as another vehicle.

13. The device of claim 9, wherein the processor is further operable to determine that the sensor data indicates that a given one of the one or more sensors is providing unreliable information, and the processor identifies the change based on the determined indication.

14. The device of claim 13, wherein the unreliable information includes one or more camera images.

15. The device of claim 9, wherein the processor is further operable to:
determine that there is no longer a change in sensor perception of the one or more sensors based on the sensor data; and
control the operation of the vehicle based on the first control strategy based on the determination that there is no longer a change.

16. The device of claim 9, wherein the processor is further operable to:
control the operation of the vehicle based on the first control strategy by maneuvering the vehicle at a first speed; and
control the operation of the vehicle based on the second control strategy by maneuvering the vehicle at a second speed different from the first speed.

17. A non-transitory, tangible computer-readable storage medium on which computer readable instructions of a program are stored, the instructions, when executed by a processor, cause the processor to perform a method of controlling a vehicle having an autonomous operation mode, the method comprising:
controlling operation of a vehicle based on a first control strategy;
identifying a sensor field based on a field of view of one or more sensors of the vehicle;
receiving sensor data from selected ones of the one or more sensors;
detecting a moving object in the roadway and a location of the object in the sensor field based on the received sensor data;

identifying a change in sensor perception of the one or more sensors based on the location of the object, the change in the sensor perception including a decrease in an ability to detect objects within the sensor field;

determining, based on the change, a second control strategy for increasing the ability to detect objects within the sensor field; and responsive to identifying the change, maneuvering the vehicle in the autonomous mode so that the vehicle falls behind the object according to the second control strategy in order to increase the ability to detect objects within the sensor field.

\* \* \* \* \*